US009836849B2

(12) United States Patent
Dickrell, III et al.

(10) Patent No.: US 9,836,849 B2
(45) Date of Patent: Dec. 5, 2017

(54) METHOD FOR THE AUTONOMOUS IMAGE SEGMENTATION OF FLOW SYSTEMS

(71) Applicant: University of Florida Research Foundation, Inc., Gainesville, FL (US)

(72) Inventors: Daniel John Dickrell, III, Gainesville, FL (US); Jacob J. Panikulam, Fort Lauderdale, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 95 days.

(21) Appl. No.: 15/007,510

(22) Filed: Jan. 27, 2016

(65) Prior Publication Data

US 2016/0217586 A1 Jul. 28, 2016

Related U.S. Application Data

(60) Provisional application No. 62/108,734, filed on Jan. 28, 2015.

(51) Int. Cl.
*G06K 9/00* (2006.01)
*G06T 7/00* (2017.01)
(Continued)

(52) U.S. Cl.
CPC .............. *G06T 7/0095* (2013.01); *G06T 7/11* (2017.01); *G06T 7/143* (2017.01); *G06T 7/168* (2017.01);
(Continued)

(58) Field of Classification Search
None
See application file for complete search history.

(56) References Cited

U.S. PATENT DOCUMENTS 5,790,699 A * 8/1998 Jackson ............... H04N 1/4092
382/199
5,923,380 A * 7/1999 Yang ..................... H04N 5/272
348/586

(Continued)

OTHER PUBLICATIONS

Chang Yao, Hou-jin Chen "Automated retinal blood vessels segmentation based on simplified PCNN and fast 2D-Otsu algorithm" Journal of Central South University of Technology Aug. 2009, vol. 16, Issue 4, pp. 640-646.

(Continued)

*Primary Examiner* — Nancy Bitar
(74) *Attorney, Agent, or Firm* — Cantor Colburn LLP

(57) ABSTRACT

Disclosed herein is a method that comprises obtaining an image of a network section through which flow occurs; where the flow is selected from a group consisting of fluid, electrons, protons, neutrons and holes; subjecting the image to a low pass filter to increase contrast in portions of the network sections; computing a local mean of visible light intensity at each pixel that is present in the image; calculating a visible light intensity difference between each pixel and the local mean of visible light intensity and producing a differentiated image using this calculation; creating a base image of the differentiated image; where the base image comprises a hand segmented gold standard dataset; removing objects below a minimum threshold size from the base image; and retaining the remaining objects if they approximate the line or spine.

17 Claims, 5 Drawing Sheets

(51) Int. Cl.
*G06T 7/11* (2017.01)
*G06T 7/143* (2017.01)
*G06T 7/168* (2017.01)

(52) U.S. Cl.
CPC ............ *G06T 2207/20064* (2013.01); *G06T 2207/20081* (2013.01); *G06T 2207/20084* (2013.01); *G06T 2207/20104* (2013.01); *G06T 2207/30016* (2013.01); *G06T 2207/30041* (2013.01); *G06T 2207/30084* (2013.01); *G06T 2207/30101* (2013.01)

(56) References Cited

U.S. PATENT DOCUMENTS

| | | | |
|---|---|---|---|
| 8,121,367 | B2 | 2/2012 | Socher |
| 8,587,657 | B2* | 11/2013 | Wang ............ G06K 9/00369 348/148 |
| 2007/0019846 | A1* | 1/2007 | Bullitt ............ G06T 7/0014 382/128 |
| 2007/0116332 | A1 | 5/2007 | Cai |
| 2012/0203530 | A1* | 8/2012 | Sharma ............ G06F 19/3437 703/9 |
| 2012/0230564 | A1 | 9/2012 | Liu |
| 2012/0262577 | A1* | 10/2012 | Wang ............ G06K 9/00369 348/148 |
| 2012/0269420 | A1 | 10/2012 | Najarian |

OTHER PUBLICATIONS

Cornforth, D. J., et al. "Development of retinal blood vessel segmentation methodology using wavelet transforms for assessment of diabetic retinopathy." Proc. 8th Asia Pacific Symp. Intell. Evolution. Syst. 2004. pp. 50-61.

M. Ashraful Amin, Hong Yan "High speed detection of retinal blood vessels in fundus image using phase congruency" Soft Computing Jun. 2011, vol. 15, Issue 6, pp. 1217-1230.

Nandy, Mahua, and Minakshi Banerjee. "Retinal vessel segmentation using Gabor filter and artificial neural network." Emerging Applications of Information Technology (EAIT), 2012 Third International Conference on. IEEE, 2012. pp. 157-160.

Oloumi, Faraz, et al. "Detection of blood vessels in fundus images of the retina using gabor wavelets." Engineering in Medicine and Biology Society, 2007. EMBS 2007. 29th Annual International Conference of the IEEE. IEEE, 2007. pp. 6451-6454.

Soares, João VB, et al. "Retinal vessel segmentation using the 2-D Gabor wavelet and supervised classification." Medical Imaging, IEEE Transactions on 25.9 (2006): 1214-1222.

* cited by examiner

METHOD FOR THE AUTONOMOUS IMAGE SEGMENTATION OF FLOW SYSTEMS

CROSS REFERENCE TO RELATED APPLICATION

This US Non-Provisional application claims the benefit of U.S. Provisional Application Ser. No. 62/108,734, filed 28 Jan. 2015, the entire contents of which are hereby incorporated by reference.

BACKGROUND

This disclosure relates to systems and to methods for analyzing objects that contain a flow field and whose features appear to develop randomly. It relates to systems and to methods for measuring apparent random patterns created in the form of paths and pathways in structures that contain flow fields. In particular, this disclosure relates to systems and to methods for image segmentation of flow systems.

Seemingly or apparent random patterns and pathways are often a part of systems and objects that occur naturally and that generally contain a flow field. An example of a naturally occurring random pathway is a river that travels across the landscape. The river possesses several bends and tributaries and it is often difficult to predict which section of the river will contain a bend or a tributary. Another example of a naturally occurring random pathway is the path taken by blood vessels in the eyeball, the heart, the lungs, the brains, or other parts of a living being. Blood vessels have a number of branches and it is difficult to predict where these branches will occur, the number of branches and the average orientation of these branches that a particular part (e.g., the heart, the eyeball, and the like) of a particular living being will have. A tree is another example of a naturally occurring structure whose branches take random pathways and the point of contact of one branch with another is an apparently random event. All of the aforementioned examples—the river, the blood vessels and the tree contain flow fields.

The ability to determine and to measure the structure of such apparently random objects permits predictive capabilities for the design of future objects. It also permits a comparison of one set of the objects (that are grown or developed under one set of circumstances) with another set of equivalent objects (that are grown or developed under a second set of circumstances). It is therefore desirable to develop methods that can be used to measure the structures and to quantify their features so that they can be compared with one another and to predict the behavior of future objects. It is also desirable to facilitate preservation of network connectivity, improve network connectivity where possible, and correct faulty and erroneous pathways with improved accuracy over current methods found in the literature.

SUMMARY

Disclosed herein is a method that comprises obtaining an image of a network section through which flow occurs; where the flow is selected from a group consisting of fluid, electrons, protons, neutrons and holes; minimizing visible light intensity differences in the image; subjecting the image to a low pass filter to increase contrast in portions of the network sections; computing a local mean of visible light intensity at each pixel that is present in the image; calculating a visible light intensity difference between each pixel and the local mean of visible light intensity and producing a differentiated image using this calculation; performing a wavelet transformation on the differentiated image; creating a base image of the differentiated image; where the base image comprises a hand segmented gold standard dataset; removing objects below a minimum threshold size from the base image; testing remaining objects in the base image for its ability to approximate a line; and retaining the remaining objects if they approximate the line; or alternatively reassembling disconnected objects if they demonstrate a least change in direction to form a repaired image of the network section.

Disclosed herein too is a system for performing a constructal analysis, the system comprising a processor and a memory to perform a method comprising obtaining an image of a network section through which flow occurs; where the flow is selected from a group consisting of fluid, electrons, protons, neutrons and holes; where the network section comprises an apparent random pathway, pattern, or network; minimizing visible light intensity differences in the image; subjecting the image to a low pass filter to reduce the images' high frequency components; computing a local mean of visible light intensity at each pixel that is present in the image; calculating a visible light intensity difference between each pixel and the local mean of visible light intensity and producing a differentiated image using this calculation; performing a wavelet transformation on the differentiated image; creating a base image of the differentiated image; where the base image comprises a hand segmented gold standard dataset; removing objects below a minimum threshold size from the base image; testing remaining objects in the base image for its ability to approximate a line; and retaining the remaining objects if they approximate the line; or alternatively reassembling disconnected objects if they demonstrate a least change in direction to form a repaired image of the network section.

DETAILED DESCRIPTION

Figure 1:
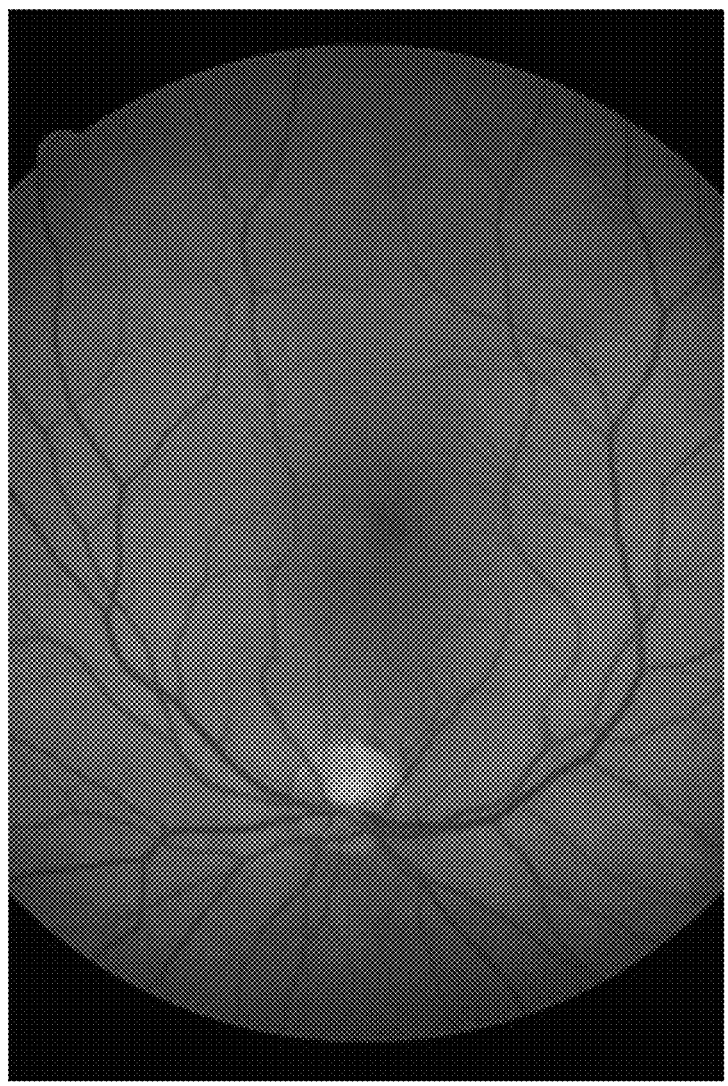
FIG. 1 is a medical image of retinal vasculature.

Disclosed herein is a system that can be used to analyze images of objects that contain an apparently random pattern or network that contains a flow field. The image is generally a network section through which flow occurs; where the flow is selected from a group consisting of fluid, electrons, protons, neutrons, living beings (e.g., animals, migrating human beings, and the like) and holes. The network section comprises an apparent random pathway, pattern, or network.

The method comprises obtaining an image of a network section through which flow occurs—where the flow is selected from a group consisting of fluid, electrons, protons, neutrons and holes. Visible light intensity differences in the image are first minimized and the image having minimized light intensity differences is then subjected a low pass filter to increase contrast in portions of the network sections. In an exemplary embodiment, the low pass filter is a Gaussian blur.

The apparent random pathway, pattern, or network is a vascular network of blood vessels in a living being. The vascular network of blood vessels are present in a retina, a heart, a brain, breast, kidney, and/or a lung of a human being. The image is obtained using magnetic resonance imaging, computed tomography, ultrasound, ultrasound thermography, opto-acoustics, infrared imaging, positron emission tomography, or xray imaging. The image is further subjected to at least one of filtering, thresholding, digitization, and image and/or feature recognition. The process further comprises deriving at least one quantitative measure from the treated network. The at least one quantitative measure can be an end to end distance of the apparent random pathway, pattern, or network; an end to end distance of a portion of the apparent random pathway, pattern, or network; a radius of gyration of at least one branch or a plurality of branches of the apparent random pathway, pattern, or network; a persistence length of a branch or a plurality of branches of the apparent random pathway, pattern, or network; an average length between branches of the apparent random pathway, pattern, or network; an average branch length of the apparent random pathway, pattern, or network; an average orientation of the apparent random pathway, pattern, or network with respect to another apparent random pathway, pattern, or network; or the tortuosity of a branch or a plurality of branches of the apparent random pathway, pattern, or network.

The image that is subjected to the low pass filter is then subjected to a computation in order to determine a local mean of visible light intensity at each pixel that is present in the image. A visible light intensity difference between each pixel and the local mean of visible light intensity is then calculated to produce a differentiated image using this calculation. A wavelet transformation on the differentiated image is then produced. Each wavelet transform produces a new image. A base image of the differentiated image is then produced where the base image comprises a hand segmented gold standard dataset. Objects below a certain minimum threshold size from the base image are then removed. The objects remaining in the image are then tested for eccentricity—i.e., they are tested for their ability to approximate a line. If the objects approximate the line they are retained in the image. Alternatively, disconnected objects are reassembled if they demonstrate a small change in direction. The change in direction should be within a desirable specified limit. Reassembling permits the formation of a repaired image of the network section.

FIG. 1 is a medical image of retinal vasculature. A colored or a black and white image of the retinal vasculature (also called the retinal fundus) is obtained. The image is shown in the FIG. 1 in black and white. The image is converted into a LAB color space—a color representation that separates lighting from color properties. By ignoring the different intensities of different portions of the image, the noise and glare due to differences in lighting are removed. The image is also subjected to a blur (detailed below) after treatment to remove differences in intensity and is shown in the FIG. 2. The image after the treatment with a blur is called a "color corrected" image.

There are a number of different methods by which the intensity differences may be reduced. One method is to determine an average light intensity for the entire image and to subtract light intensities that are greater than a certain light intensity value or less than a certain light intensity value from the average light intensity. Another method comprises arbitrarily subtracting a certain value of light intensity from the greatest light intensities on the image or on portions of the image. Arbitrary light intensities may be added to other portions of the image where the light intensity is below a certain value. The net effect of these methods is to have an image where light intensity differences (from a region of greatest light intensity to a region of lowest light intensity) across the image lies within a desired range. In an exemplary embodiment, the process autonomously figures out what light intensity values to use via statistical analysis/machine learning.

A blur is applied to the image shown in the FIG. 1 to further reduce noise. This is called the cleaned image and is depicted in the FIG. 2. There are a number of different types of blurs that may be used to reduce noise (or to reduce contrast). Examples of blurs are a Gaussian blur, a median blur, pyramid filtering, or the like, or a combination thereof. In an exemplary embodiment, the blur is a Gaussian blur. A Gaussian blur (also known as Gaussian smoothing) blurs the image by the application of a Gaussian function to the image. It is used to reduce image noise and reduce detail. The visual effect of this blurring technique is a smooth blur resembling that of viewing the image through a translucent screen. Mathematically, applying a Gaussian blur to an image is the same as convolving the image with a Gaussian function. This is also known as a two-dimensional Weierstrass transform. Since the Fourier transform of a Gaussian is another Gaussian, applying a Gaussian blur has the effect of reducing the image's high-frequency components; a Gaussian blur is thus a low pass filter.

Figure 2:
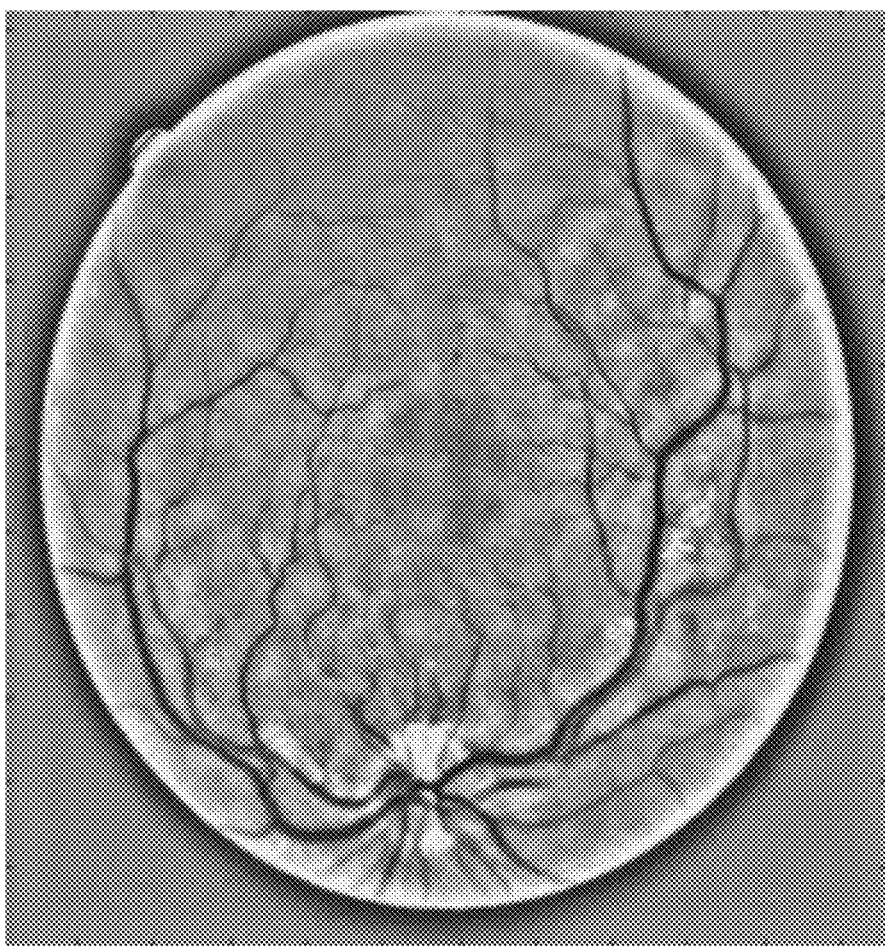
FIG. 2 shows the image of the FIG. 1 after light treatment to normalize intensity differences in the image and the application of a Gaussian blur.

From the FIG. 2 it is clear to an observer that the blood vessels "stick out" from the background, but it is not simple for a computer to isolate them. To emphasize objects that differ from background, the local mean at each pixel is computed—by taking a moving average in the shape of a circle of all of the pixels within a radius of 20 to 100 pixels, preferably 40 to 60 pixels and most preferably 50 pixels. The difference between each pixel in the cleaned image, and the average of its surrounding pixels is a good approximation of how "different" that pixel is. For example, an image is made from the "color correction". This is called "Image #1". A second image (called the Image #2") is made from the rolling average on the color-correction. The "difference in each pixel" refers to Image #3=Image #2−Image #1. In short, the new value of each pixel in the image #3 is its value in the "Image #2" minus the value of each pixel in "Image #1".

Figure 3:
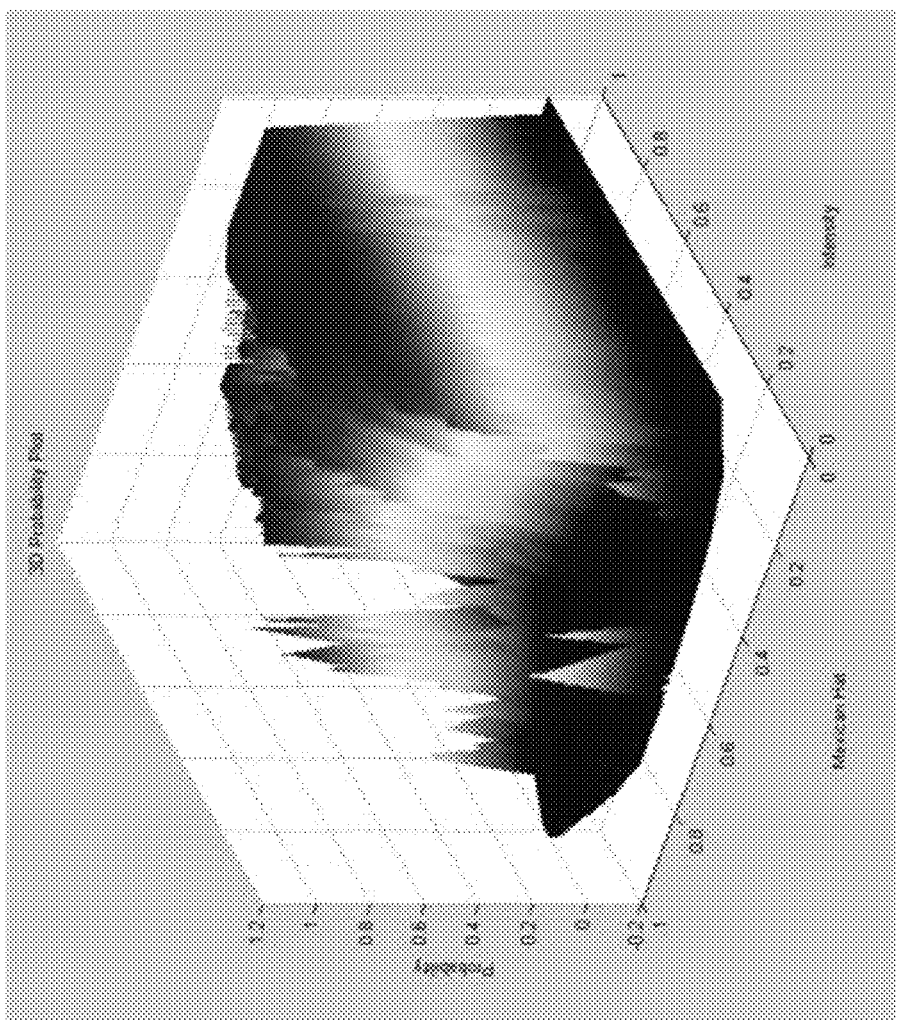
FIG. 3 is a depiction of a plot of vessel probability versus wavelet output and intensity for the image of the FIG. 2.

A two dimensional continuous wavelet transform is applied to the differenced image at multiple scales (in this case, the Mexican Hat, or Sombrero wavelet is used). A wavelet is a function that is like a moving average, except that instead of averaging the pixels, the wavelet takes the weighted sum of each pixel, where the weight is decided by each pixels distance from the center pixel. The Mexican Hat wavelet was chosen over others for its simplicity and frequency response characteristics. In this context, "different scales" means different sizes of pixel regions were taken. A plot of vessel probability versus wavelet output and intensity is shown in the FIG. 3.

The Mexican hat wavelet is the negative normalized second derivative of a Gaussian function, i.e., up to scale and normalization, the second Hermite function. It is a special case of the family of continuous wavelets (wavelets used in a continuous wavelet transform) known as Hermitian wavelets. This wavelet is frequently employed to model seismic data, and as a broad spectrum source term in computational electrodynamics. It is usually only referred to as the Mexican hat wavelet in the Americas, due to taking the shape of a sombrero when used as a 2D image processing kernel. It is otherwise called the Ricker wavelet. The multidimensional generalization of this wavelet is called the Laplacian of Gaussian function. In practice, this wavelet is sometimes approximated by the difference of Gaussian functions, because it is separable and can therefore save considerable computation time in two or more dimensions. The scale normalized Laplacian (in $L_1$-norm) is frequently used as a blob detector and for automatic scale selection in computer vision applications. The Mexican hat wavelet can also be approximated by derivatives of Cardinal B-Splines.

Each wavelet transform produces a new image. Each pixel in these images corresponds to the value returned by the wavelet transform centered at that pixel. By taking each pixel at the same position in all of these images and the differenced image, a "feature vector" for every pixel is created. That is, a vector of length n, where n is the number of images produced. Each pixel in the original image now has its own feature vector of length n.

A learning machine (a two layer 20 neuron neural network, in this case) is trained on the feature vectors, using the hand-segmented Gold Standard dataset as ground truth. A neural network, despite its name, does not function as an artificial intelligence device. The neural network is an machine learning tool that fits curves to complicated data. In this case, the neural network figures out where the border is between the "blood vessel" and "not a blood vessel". The pattern that defines this difference is too complicated for a human to describe, but is clearly visible. For this reason, a neural network is used to discover these patterns and use them. The neural network was trained using a technique called "Conjugate-Gradient Optimization". It tries effectively random patterns on input images, compare the result to the "Gold Standard" human-segmented images. It then makes a small change to the pattern, and based on how much it improved, it continues to change the pattern. It does this tens of thousands of times until it is very accurate.

Figure 4:
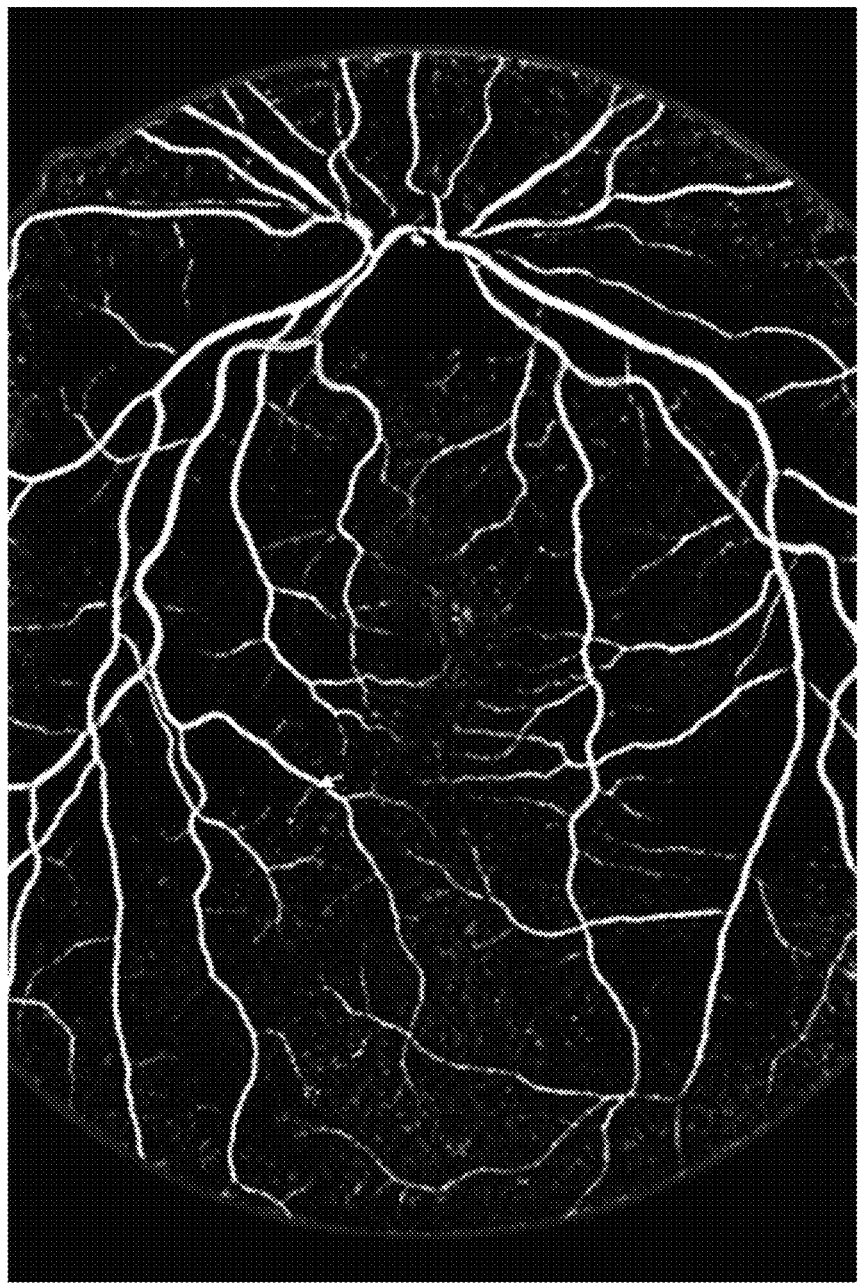
FIG. 4 depicts the image of the FIG. 1 as obtained from the output of a neural network.

The neural network is also used as a tool to "learn" correlations that are already known to exist, and produce a continuous function for classifying a pixel as "part of a vessel" or "not part of a vessel" (white and black respectively). When the neural network is trained on the feature vectors generated from all of the images in the gold standard set, the same network can then classify feature vectors from images outside of the training set. The output of the neural network is displayed in the FIG. 4.

Figure 5:
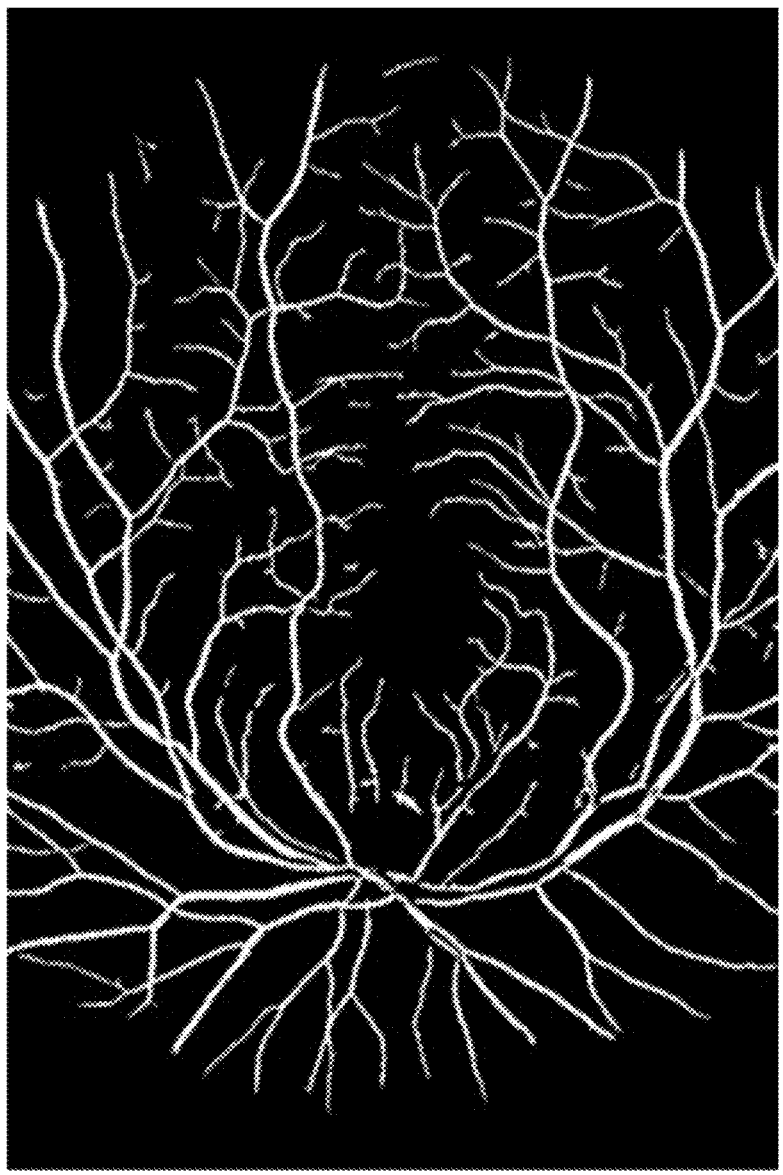
FIG. 5 represents the image of the FIG. 4 with the fractured blood vessels of the FIG. 4 repaired.

In order to eliminate noise, all of the objects below a minimum size threshold are removed. In short, anything smaller than 10 pixels is always eliminated following which anything smaller than the $10^{th}$ percentile in size is also removed. Since the goal of the technique is to create a mostly continuous blood vessel structure, once reconnection is done, anybody that does not have at least several thousand pixels is dismissed as noise. Those above are tested for their eccentricity, which is a measure of how closely they approximate a straight line or a spline. If they are close to a line, they are assumed to represent a fractured blood vessel. The fractured vessels are reassembled by finding the known blood vessel that attaches to it with the least change in direction. This image is displayed in the FIG. 5. The FIG. 5 represents the image of the FIG. 4 with the fractured blood vessels of the FIG. 4 repaired.

The method is advantageous in that it can be applied to any apparently random pattern, pathway, or network whose connections can be calculated and performance can be measured. Apparent random patterns, pathways, or networks are capable of being analyzed by this method to diagnose improper functions and disease. A novel aspect of this disclosure is the combination of spatial feature imaging with functional performance metrics (e.g., the flow resistance or conductance, flow volume, pressure and viscosity of fluid, and the like) in a computational tool that can directly diagnose medical abnormalities from the raw input image. The method can also be used to design and to synthesize prosthetics (or replacement parts) for existing organisms or to correct for damages in other flow systems (e.g., streams, rivers, complex electrical circuits, semiconductors, and the like).

In an exemplary embodiment, the method can be used to estimate brain function and brain morphology and topology. It can also be used to distinguish functional portions of the brain from damaged or non-functional portions of the brain. For example, a functional magnetic resonance image (fMRI) of a human brain shows local regions of activity within the three-dimensional volume of the brain. Using the spatial distribution of the areas of interest within the brain extracted from the image (the interconnected-ness of the regions) and combined with the performance metrics (from the fMRI analysis) this method would quantitatively determine differences between healthy brain activity and unhealthy brain activity. While the foregoing is directed to describing how the brain may be analyzed, the system and the method are not restricted to examining the brain, but can be used to analyze other parts of the body such as the eyes, the lungs, the heart and other parts of the vascular system. This method of analysis may also be used to repair other flow systems (e.g., streams and rivers that have been damaged from floods, droughts, and the like).

In another embodiment, the system and the methods described herein can be used to measure the apparently random pattern, pathway, or network and be used to characterize its features such as its end to end distance, its radius of gyration, its tortuosity, the ability of the structure to permit a fluid to flow through it, atomic and sub-atomic particles (e.g., electrons, protons, photons, holes, and the like), energy, and the like, to flow through it. In one exemplary embodiment, features of the random pattern, pathway, or network can be characterized using spatial analysis so long as it involves a flow along the apparently random pattern, pathway, or network. The system disclosed herein can also be used to deduce information about the neighborhood surrounding the apparently random patterns, pathways, and networks. It can also be used to study the events surrounding a series of events so long as the series of events are affected by the event.

The term "seemingly" or "apparent" or "apparently" is used because the pathways, patterns or networks described herein appear to be random (i.e., they have tortuous pathways that appear to be random), but can actually be characterized using thermodynamic concepts such as the "efficiency of the system" "boundary conditions", "energy minimization", "guiding forces", "design constraints", "minimization of losses" or the like. The apparent pathway, pattern or network may also be characterized as a naturally occurring pathway, pattern or network and comprises a flow field. It can also be called a transport network since it transports a fluid, atomic and sub-atomic particles, energy, or the like.

The term "seemingly" or "apparent" or "apparently" is used because the pathways, patterns or networks described herein can be mathematically characterized in addition to being statistically characterized. A truly random pattern or network can only be statistically characterized, while a seeming or apparent network can be mathematically characterized without the use of statistical terms such as standard deviations, mean, and the like. The mathematical characterization involves transport parameters of the system such as flow conductance or resistance, flow volume, flow viscosity, sedimentation rate, or the like in addition to structural parameters such as the radius of gyration, tortuosity, number of contact points between different sections of the network, and the like.

The resulting analysis and the data obtained therefrom can be used to compare a first random pattern, pathway, network, or a series of events with a second random pattern, pathway, network, or a series of events that is grown or developed under different circumstances, or at another location, or at another time in the same or different location. The comparison can be used to assess the quality of the first random pattern, pathway, network, or a series of events with respect to the second random pattern, pathway, network, or series of events. The resulting analysis, the data obtained therefrom and any data pertaining to the comparison can be transmitted to a screen, printed out on a sheet, saved and stored on a solid state drive, a hard disc drive or a floppy disc.

The system comprises an imaging device in operative communication with a computer that contains code or software to analyze a portion of the image and to provide various parameters that characterize the pathway, pattern, network, or random series of events. The code or software comprises an image processing algorithm that can measure one or more features of the image and can provide details about an analyzed feature of the image using constructal analysis.

Disclosed herein too is a method that can be used to analyze images of objects that contain a random pattern, pathway, network, or series of events. The method comprises capturing an image of a random pathway, pattern, network, or a series of events, or the like. The image is then transmitted to a computer (e.g., a device having a memory and a processor) where an algorithm may be initiated to separate the flow field from the background of the image. Parameters of the flow field such as end points can be measured. These parameters can be used to determine the quality or condition of the flow field.

As noted above, the method comprises obtaining an image of the organ (e.g., heart, eye, brain, lung, and the like) or object (e.g., semiconductor, non-intrinsically conducting electrical materials such as conductive polymers, and the like). The image of the organ or object is partitioned into sub-regions based on metabolic need and function. For example, if the image is one of the brain, its metabolic need is glucose and it's function is to transmit neurons. The needs of the sub-regions are then determined. The needs of the sub-regions are determined on a volumetric basis (e.g., amount of glucose per unit volume or volumetric blood flow), on a functional basis (e.g., neurons per unit of glucose), or the like. It is to be noted that this approach is also applicable to electrical or pneumatic distribution in systems that use electricity and or fluids for functioning.

Embodiments of the present disclosure can be implemented as logic executed in one or more computing devices. A computing device according to the disclosure can include at least one processor and a memory, both of which are in electrical communication with a local interface. To this end, the computing device may comprise, for example, at least one server computer or like device. The local interface may comprise, for example, a data bus with an accompanying address/control bus or other bus structure as can be appreciated.

Stored in the memory are both data and several components that are executable by the processor. In particular, stored in the memory and executable by the processor is an application implementing logic according to the present disclosure as well as potentially other applications. It is understood that there may be other applications that are stored in the memory and are executable by the processors as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory and are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and the memory may represent multiple memories that operate in parallel processing circuits, respectively. In such a case, the local interface may be an appropriate network that facilitates communication between any two of the multiple processors, between any processor and any of the memories, or between any two of the memories, and the like. The local interface may comprise additional systems designed to coordinate this communication, including, for example, performing load balancing. The processor may be of electrical or of some other available construction.

Although executable logic of an embodiment of the disclosure may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application according to an embodiment of the disclosure that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The data can be stored on the cloud and can be made accessible to specialists across the world. This will permit remote access of images and testing of patients in remote regions across the world. Storage of data on the cloud can be used to compare behavior or morphology in normal populations versus diseased populations and to aggregate such statistics in mass populations.

The system and method disclosed herein is used to evaluate automated fundus photographic analysis algorithms of a computer-assisted diagnostic system for grading diabetic retinopathy, to evaluate therapeutic responses of anti-angiogenic drugs in choroidal neovascularization, to evaluate optic neuritis along with degeneration of the retinal nerve fiber layer that is highly associated with multiple sclerosis, to evaluate ocular migraines associated with systemic vascular disease and high blood pressure, to evaluate the condition of blood vessels and/or nerves when affected by hypertension, chronic kidney failure, atherosclerosis, pulmonary diseases such as emphysema, chronic bronchitis, asthma, chronic obstructive pulmonary disease, interstitial lung disease and pulmonary embolism, cardiovascular diseases, myocardial infarction, aneurysms, transient ischemic attack, brain diseases, concussions, Alzheimer's disease and/or strokes.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method comprising:
obtaining an image of a network section through which flow occurs; where the flow is selected from a group consisting of fluid, electrons, protons, neutrons and holes;
minimizing visible light intensity differences in the image;
subjecting the image to a low pass filter to reduce the images' high frequency components;
computing a local mean of visible light intensity at each pixel that is present in the image;
calculating a visible light intensity difference between each pixel and the local mean of visible light intensity and producing a differentiated image using this calculation;
performing a wavelet transformation on the differentiated image;
creating a base image of the differentiated image; where the base image comprises a hand segmented gold standard dataset;
removing objects below a minimum threshold size from the base image;
testing remaining objects in the base image for its ability to approximate a line; and
retaining the remaining objects if they approximate the line; or alternatively reassembling disconnected objects if they demonstrate a least change in direction to form a repaired image of the network section.

2. The method of claim 1, where minimizing the visible light intensity differences in the image comprises subtracting a portion of light intensity from those portions of the image that have a greater light intensity than other portions.

3. The method of claim 1, where the low pass filter is a Gaussian blur.

4. The method of claim 1, where the low pass filter comprises convolving the image with a Gaussian function.

5. The method of claim 1, where computing a local mean of visible light intensity at each pixel comprises taking a moving average in the shape of a circle of all pixels in a radius of 30 to 100 pixels.

6. The method of claim 1, where performing a wavelet transformation comprises taking a weighted sum of each pixel, where the weight is decided by each pixel distance from a center pixel.

7. The method of claim 1, where the wavelet transformation comprises a Mexican Hat wavelet.

8. The method of claim 1, where the line is straight.

9. The method of claim 1, where the line is curved.

10. A system for performing a constructal analysis, the system comprising a processor and a memory to perform a method comprising:
- obtaining an image of a network section through which flow occurs; where the flow is selected from a group consisting of fluid, electrons, protons, neutrons and holes; where the network section comprises an apparent random pathway, pattern, or network;
- minimizing visible light intensity differences in the image;
- subjecting the image to a low pass filter to reduce the images' high frequency components;
- computing a local mean of visible light intensity at each pixel that is present in the image;
- calculating a visible light intensity difference between each pixel and the local mean of visible light intensity and producing a differentiated image using this calculation;
- performing a wavelet transformation on the differentiated image;
- creating a base image of the differentiated image; where the base image comprises a hand segmented gold standard dataset;
- removing objects below a minimum threshold size from the base image;
- testing remaining objects in the base image for its ability to approximate a line; and
- retaining the remaining objects if they approximate the line; or alternatively reassembling disconnected objects if they demonstrate a least change in direction to form a repaired image of the network section.

11. The system of claim 10, where the system is used to evaluate images for grading diabetic retinopathy, to evaluate therapeutic responses of anti-angiogenic drugs in choroidal neovascularization, to evaluate optic neuritis along with degeneration of the retinal nerve fiber layer that is highly associated with multiple sclerosis, to evaluate ocular migraines associated with systemic vascular disease and high blood pressure, to evaluate the condition of blood vessels and/or nerves when affected by hypertension, chronic kidney failure, atherosclerosis, pulmonary diseases such as emphysema, chronic bronchitis, asthma, chronic obstructive pulmonary disease, interstitial lung disease and pulmonary embolism, cardiovascular diseases, myocardial infarction, aneurysms, transient ischemic attack, brain diseases, concussions, Alzheimer's disease and/or strokes.

12. The system of claim 10, where the apparent random pathway, pattern, or network is a vascular network of blood vessels in a living being.

13. The system of claim 12, where the vascular network of blood vessels are present in a retina, a heart, a brain, breast, kidney, and/or a lung of a human being.

14. The system of claim 10, where the image is obtained using magnetic resonance imaging, computed tomography, ultrasound, ultrasound thermography, opto-acoustics, infrared imaging, positron emission tomography, visible light photography and xray imaging.

15. The system of claim 14, where the image is further subjected to at least one of filtering, thresholding, digitization, and image and/or feature recognition.

16. The system of claim 15, further comprising deriving at least one quantitative measure from the smoothed network.

17. The system of claim 16, where the at least one quantitative measure is an end to end distance of the apparent random pathway, pattern, or network; an end to end distance of a portion of the apparent random pathway, pattern, or network; a radius of gyration of at least one branch or a plurality of branches of the apparent random pathway, pattern, or network; a persistence length of a branch or a plurality of branches of the apparent random pathway, pattern, or network; an average length between branches of the apparent random pathway, pattern, or network; an average branch length of the apparent random pathway, pattern, or network; an average orientation of the apparent random pathway, pattern, or network with respect to another apparent random pathway, pattern, or network; or the tortuosity of a branch or a plurality of branches of the apparent random pathway, pattern, or network.

* * * * *